(12) United States Patent
Peli

(10) Patent No.: US 10,031,346 B2
(45) Date of Patent: Jul. 24, 2018

(54) VISION MODIFICATION BASED ON A MULTIPLEXING PRISM

(71) Applicant: The Schepens Eye Research Institute, Inc., Boston, MA (US)

(72) Inventor: Eliezer Peli, Boston, MA (US)

(73) Assignee: The Schepens Eye Research Institute, Inc., Boston, MA (US)

( * ) Notice: Subject to any disclaimer, the term of this patent is extended or adjusted under 35 U.S.C. 154(b) by 0 days.

(21) Appl. No.: 14/769,051

(22) PCT Filed: Feb. 20, 2014

(86) PCT No.: PCT/US2014/017351
§ 371 (c)(1),
(2) Date: Aug. 19, 2015

(87) PCT Pub. No.: WO2014/130647
PCT Pub. Date: Aug. 28, 2014

(65) Prior Publication Data
US 2016/0004101 A1   Jan. 7, 2016

Related U.S. Application Data

(60) Provisional application No. 61/767,028, filed on Feb. 20, 2013.

(51) Int. Cl.
*G02C 7/02* (2006.01)
*G02C 7/08* (2006.01)
(Continued)

(52) U.S. Cl.
CPC .............. *G02C 7/022* (2013.01); *G02B 5/04* (2013.01); *G02C 7/088* (2013.01); *G02C 7/14* (2013.01)

(58) Field of Classification Search
CPC . G02C 7/14; G02C 7/022; G02C 7/08; G02C 7/088; G02B 5/04
(Continued)

(56) References Cited

U.S. PATENT DOCUMENTS 4,497,860 A * 2/1985 Brady, Jr. ............... G02B 3/08
346/77 E
5,298,971 A * 3/1994 Huang ................. G01B 11/255
356/520

(Continued)

FOREIGN PATENT DOCUMENTS

JP  11-84110  * 3/1999
JP  2008-168503  * 7/2008

OTHER PUBLICATIONS

Apfelbaum et al., Considering Apical Scotomas, Confusion, and Diplopia When Prescribing Prisms for Homonymous Hemianopia. Transl Vis Sci Technol. May 2013;2(4):2.
(Continued)

*Primary Examiner* — Jordan Schwartz
(74) *Attorney, Agent, or Firm* — Mintz Levin Cohn Ferris Glovsky and Popeo, P.C.

(57) ABSTRACT

In some example implementations, there is provided an apparatus. The apparatus may include a plurality of prism portions configured to shift light passing through the apparatus including the plurality of prisms portions, and a plurality of portions configured to pass light unshifted through the apparatus, wherein the apparatus combines the shifted light and the unshifted light passing through the apparatus. Related apparatus are also disclosed.

9 Claims, 14 Drawing Sheets

(51) Int. Cl.
G02C 7/14 (2006.01)
G02B 5/04 (2006.01)

(58) Field of Classification Search
USPC ............ 351/159.17, 159.45, 159.58, 159.59,
351/159.09, 159.55; 359/831, 837
See application file for complete search history.

(56) References Cited

U.S. PATENT DOCUMENTS

| | | | |
|---|---|---|---|
| 5,323,190 A | 6/1994 | Onufryk | |
| 5,969,790 A * | 10/1999 | Onufryk | G02C 7/14 351/159.58 |
| 5,995,266 A * | 11/1999 | Biverot | G02B 26/0875 345/8 |
| 6,147,804 A * | 11/2000 | Kashima | G02B 5/021 359/536 |
| 6,577,447 B1 * | 6/2003 | Ai | G03F 7/706 359/621 |
| 7,230,758 B2 * | 6/2007 | Huang | G03B 21/625 359/457 |
| 2001/0048503 A1 | 12/2001 | Krebs | |
| 2005/0083593 A1 * | 4/2005 | Addison | B44F 1/06 359/837 |
| 2007/0097316 A1 | 5/2007 | Peli | |
| 2007/0285773 A1 * | 12/2007 | Ogawa | G02B 3/08 359/457 |
| 2008/0013323 A1 * | 1/2008 | Katsumoto | G02B 6/0053 362/311.06 |
| 2009/0009870 A1 * | 1/2009 | Usami | E06B 9/24 359/592 |
| 2009/0153776 A1 * | 6/2009 | Hsu | G02B 5/045 349/64 |
| 2013/0258634 A1 * | 10/2013 | Xu | G02B 5/0231 362/19 |

OTHER PUBLICATIONS

Apfelbaum et al., Heading assessment by "tunnel vision" patients and control subjects standing or walking in a virtual reality environment. ACM Trans Appl Percept. Jan. 2007;4(1):8.
Bailey, I. Mirrors for visual field defects. Optom Monthly 1982;73:202-206.
Bootsma et al., Information used in detecting upcoming collision. Perception. 2003;32(5):525-44.
Bowers et al., Community-based trial of a peripheral prism visual field expansion device for hemianopia. Arch Ophthalmol. May 2008;126(5):657-64.
Bowers et al., Evaluation of a prototype Minified Augmented-View device for patients with impaired night vision. Ophthalmic Physiol Opt. Jul. 2004;24(4):296-312.
Bowers et al., Preferred retinal locus and reading rate with four dynamic text presentation formats. Optom Vis Sci. Mar. 2004;81(3):205-13.
Bowers et al., Randomised Controlled Multi-Center Trial of High-Power Peripheral Prism; Glasses for Hemianopia—Final Results. ARVO Annual Meeting Abstract. Investigative Ophthalmology & Visual Science. Apr. 2010;51(13):6006.
Cohen et al., Visual field remediation. In: R.G. Cole, & B.P. Rosenthal (Eds.), Remediation and Management of Low Vision (pp. 1-25). St. Louis: Mosby. (1996).
Cohen, A. Practical design of a bifocal hologram contact lens or intraocular lens. Applied Optics. 1992;31(19):3750-4.
Cohen, J. An overview of enhancement techniques for peripheral field loss. J Am Optom Assoc. Jan. 1993;64(1):60-70.
Di Fabio et al., Saccade-stepping interactions revise the motor plan for obstacle avoidance. J Mot Behav. Dec. 2003;35(4):383-97.
Folstein et al., "Mini-mental state". A practical method for grading the cognitive state of patients for the clinician. J Psychiatr Res. Nov. 1975;12(3):189-98.

Freeman et al., Visual field loss increases the risk of falls in older adults: the Salisbury eye evaluation. Invest Ophthalmol Vis Sci. Oct. 2007;48(10):4445-50.
Grover et al., Patterns of visual field progression in patients with retinitis pigmentosa. Ophthalmology. Jun. 1998;105(6):1069-75.
Harris et al., Is optic flow used to guide walking while wearing a displacing prism? Perception. 2001;30(7):811-8.
Haymes et al., Mobility of people with retinitis pigmentosa as a function of vision and psychological variables. Optom Vis Sci. Oct. 1996;73(10):621-37.
Hoeft et al., Amorphic lenses: a mobility aid for patients with retinitis pigmentosa. Am J Optom Physiol Opt. Feb. 1985;62(2):142-8.
Ivers et al., Sensory impairment and driving: the Blue Mountains Eye Study. Am J Public Health. Jan. 1999;89(1):85-7.
Jung et al., Impact of high power and angle of incidence on prism corrections for visual field loss. Opt Eng. Jan. 17, 2014;53(6).
Kozlowski et al., An improved negative-lens field expander for patients with concentric field constriction. Arch Ophthalmol. Mar. 1985;103(3):326.
Kozlowski et al., Negative-lens field expander for patients with concentric field constriction. Arch Ophthalmol. Aug. 1984;102(8):1182-4.
Kuyk et al., Visual correlates of mobility in real world settings in older adults with low vision. Optom Vis Sci. Jul. 1998;75(7):538-47.
Kuyk et al., Visual correlates of obstacle avoidance in adults with low vision. Optom Vis Sci. Mar. 1998;75(3):174-82.
Lichtenstein et al., A Feedback-Controlled Interface for Treadmill Locomotion in Virtual Environments. ACM Trans Appl Percept. Jan. 2007;4(1):7.
Long et al., Mobility in individuals with moderate visual impairments. J. Vis. Impairment Blindness. 1990;84:111-8.
Lovie-Kitchin et al., What areas of the visual field are important for mobility in low vision patients? Clinical Vision Sciences. 1990;5(3):249-63.
Luo et al., Collision judgment when viewing minified images through a HMD visual field expander. Proceedings of the SPIE. Ophthalmic Technologies XVII, 6426, 64261Z. SPIE. Mar. 5, 2007. [Abstract Only].
Luo et al., The role of peripheral vision in saccade planning: learning from people with tunnel vision. J Vis. Dec. 22, 2008;8(14):25.1-8.
Luo et al., Use of an augmented-vision device for visual search by patients with tunnel vision. Invest Ophthalmol Vis Sci. Sep. 2006;47(9):4152-9.
Marigold et al., Visual information from the lower visual field is important for walking across multi-surface terrain. Exp Brain Res. Jun. 2008;188(1):23-31.
Marron et al., Visual factors and orientation-mobility performance. Am J Optom Physiol Opt. May 1982;59(5):413-26.
Massof et al., Visual function assessment questionnaires. Surv Ophthalmol. May-Jun. 2001;45(6):531-48.
May, B. Nike Hindsight. Oct. 21, 2008; http://www.coroflot.com/billymay/Nike-Hindsight, accessed Sep. 18, 2012.
Moore et al., Effect of viewing distance on the generation of vertical eye movements during locomotion. Exp Brain Res. Dec. 1999;129(3):347-61.
Patla et al., What visual information is used for navigation around obstacles in a cluttered environment? Can J Physiol Pharmacol. Aug.-Sep. 2004;82(8-9):682-92.
Peli et al. Oblique Peripheral Prisms: A New Design for Optical Treatment of; Hemianopia. ARVO Annual Meeting Abstract. Investigative Opthalmology & Visual Science. Apr. 2009; 50(13):4733.
Peli et al., Applications of Augmented Vision Head-Mounted Systems in Vision Rehabilitation. J Soc Inf Disp. Dec. 2007;15(12):1037-1045.
Peli et al., In-the-spectacle-lens telescopic device. J Biomed Opt. May-Jun. 2008;13(3):034027.
Peli, E. Field expansion for homonymous hemianopia by optically induced peripheral exotropia. Optom Vis Sci. Sep. 2000;77(9):453-64.

(56) References Cited

OTHER PUBLICATIONS

Peli, E. Treating with spectacle lenses: a novel idea!? Optom Vis Sci. Sep. 2002;79(9):569-80.
Peli, E. Vision multiplexing: an engineering approach to vision rehabilitation device development. Optom Vis Sci. May 2001;78(5):304-15.
Regan et al., Hitting what one wants to hit and missing what one wants to miss. Vision Res. 2001;41(25-26):3321-9.
Regan et al., Visual processing of the motion of an object in three dimensions for a stationary or a; moving observer. Perception. 1995;24(1):87-103.
Soltys et al., DAF/CD55 and Protectin/CD59 modulate adaptive immunity and disease outcome in experimental autoimmune myasthenia gravis. J Neuroimmunol. Mar. 2012;244(1-2):63-9.
Somani et al., Visual field expansion in patients with retinitis pigmentosa. Can J Ophthalmol. Feb. 2006;41(1):27-33.
Stringer et al., Extended wearing trial of Trifield prism visual aid for tunnel vision among patients with retinitis pigmentosa or choroidermia (abstract). Investigative Ophthalmology & Vision Science. May 2004;45(13):1400.
Szlyk et al., Use of bioptic amorphic lenses to expand the visual field in patients with peripheral loss.; Optom Vis Sci. Jul. 1998;75(7):518-24.
Turano et al., Direction of gaze while walking a simple route: persons with normal vision and persons with retinitis pigmentosa. Optom Vis Sci. Sep. 2001;78(9):667-75.
Turano et al., Mobility performance in glaucoma. Invest Ophthalmol Vis Sci. Nov. 1999;40(12):2803-9.
Turano et al., Oculomotor strategies for the direction of gaze tested with a real-world activity. Vision Res. Feb. 2003;43(3):333-46.
Turano et al., Perceived visual ability for independent mobility in persons with retinitis pigmentosa. Invest Ophthalmol Vis Sci. Apr. 1999;40(5):865-77.
Vargas-Martin et al., Eye movements of patients with tunnel vision while walking. Invest Ophthalmol Vis Sci. Dec. 2006;47(12):5295-302.
Weiss, N. Low vision management of retinitis pigmentosa. J Am Optom Assoc. Jan. 1991;62(1):42-52.
Weiss, N. Remediation of peripheral visual field defects in low vision patients. Probl Optom. 1992;4:34-54.
Woods et al., Development and testing of Trifield glasses for people with severely restricted visual fields (abstract). Optometry and Vision Science. Dec. 13, 2002. Poster #158, p. 187.
Woods et al., Extended wearing trial of Trifield lens device for 'tunnel vision'. Ophthalmic Physiol Opt. May 2010;30(3):240-52.
Xuebin et al., Genetic diversity and differentiation of Mongolian and Russian yak populations. J Anim Breed Genet. Apr. 2005;122(2):117-26.
Zebehazy et al., Establishing Mobility Measures to Assess the Effectiveness of Night Vision Devices: Results of a Pilot Study. J Vis Impair Blind. Oct. 2005;99(10):663-670.
Zohar, D. Why do we bump into things while walking. Hum Factors. Dec. 1978;20(6):671-9.

\* cited by examiner

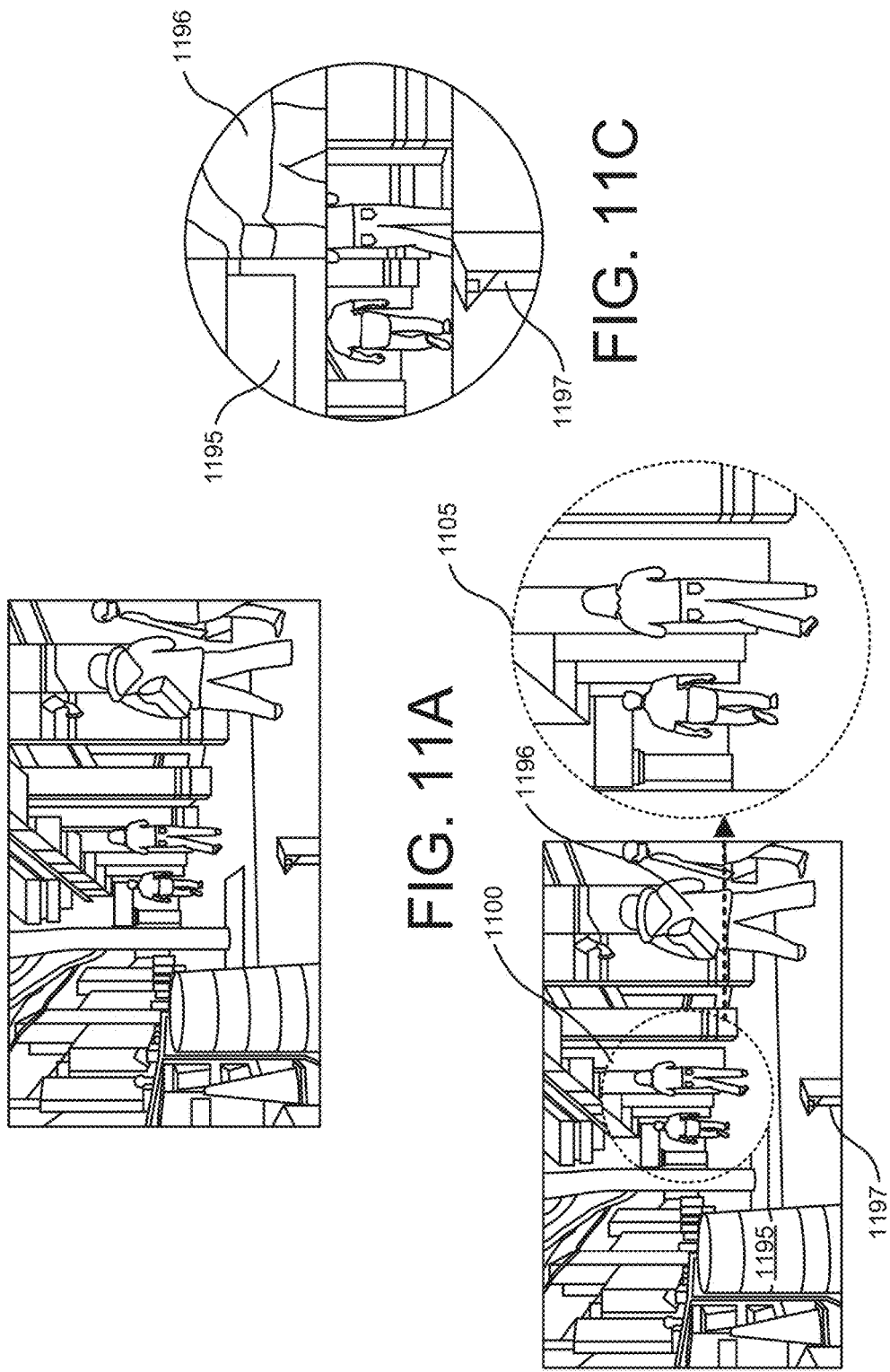

VISION MODIFICATION BASED ON A MULTIPLEXING PRISM

RELATED APPLICATIONS

The application is a national stage application, filed under 35 U.S.C. § 371, of International Application No. PCT/US2014/017351, filed Feb. 20, 2014, which claims priority under 35 U.S.C. § 119 to U.S. Patent Application No. 61/767,028 filed Feb. 20, 2013, the entire contents of each are hereby incorporated by reference in their entirety.

STATEMENT REGARDING FEDERALLY SPONSORED RESEARCH

This invention was made with government support under EY 12890 and EY 023385 awarded by National Institutes of Health. The government has certain rights in the invention.

TECHNICAL FIELD

This disclosure relates generally to optics and vision modification.

BACKGROUND

A prism is a transparent optical element with flat, polished surfaces that refract light. At least two of the flat surfaces must have an angle between them. The intersection of those surfaces is the prism apex, and the line of intersection is the apex axis. The prism face opposite the apex is termed the base. The exact angles between the surfaces can be configured based on the application. The traditional geometrical shape is that of a triangular prism with a triangular bottom and rectangular sides, and in colloquial use "prism" usually refers to this type. Some types of optical prism are not in fact in the shape of geometric prisms. Prisms can be made from any material that is transparent to the wavelengths for which they are designed. Typical materials include glass, plastic, and fluorite, although other materials are possible. Ray angle deviation and dispersion through a prism can be determined by tracing a sample ray through the element and using Snell's law at each interface.

A Fresnel prism is composed of prismatic elements arranged in an array with the base of each element adjacent to the apex of the next, yielding a device with refraction properties similar to a conventional prism of the same extent but significantly thinner and less bulky.

The shifted field of view through a conventional or Fresnel prism is substituted for the view behind the prism, resulting in a loss of field behind the prism at the prism apex equal in extent to the amount of shift provided by the prism (its angle of refraction). This field loss is referred to as the prism apical scotoma.

SUMMARY

In some example implementations, there is provided an apparatus. The apparatus may include a plurality of prism portions configured to shift light passing through the apparatus including the plurality of prisms portions; and a plurality of portions configured to pass light unshifted through the apparatus, wherein the apparatus combines the shifted light and the unshifted light passing through the apparatus.

In some variations, one or more of the following features can optionally be included in any feasible combination. The apparatus may combine by at least multiplexing the shifted light and the unshifted light passing through the apparatus. The plurality of portions may comprise a plurality of substantially flat portions configured to pass light unshifted through the apparatus. The apparatus may move a view from a portion of a visual field to another portion of the visual field. The apparatus may comprise at least one lens including the plurality of prism portions and the plurality of portions. The apparatus may be used to shift a view from a portion of a field of view lacking vision to another portion having vision. At least one of the plurality of portions may be flat, and the at least one of the plurality of portions may have been provided by flattening a point of the at least one prism portions. At least one of the plurality of portions may be positioned between a base of a first one of the plurality of prism portions and a second apex of the plurality of prism portions. The plurality of prism portions may comprise Fresnel prisms.

In some example implementations, there is provided another apparatus. The apparatus may include at least one lens including a first prism having a first apex and a first base, a second prism having a second apex and a second base, and may include a third prism having a third apex and a third base, wherein the first apex and the second apex are oriented in an apex-to-apex configuration, wherein the third prism is positioned below the first and second prisms, wherein the third base is oriented in downward direction.

In some variations, one or more of the following features can optionally be included in any feasible combination. At least one of the first prism, the second prism, and the third prism may further comprise a plurality of prism portions configured to shift light passing through the apparatus including the plurality of prisms portions, and may include a plurality of portions configured to pass light unshifted through the apparatus including the plurality of prisms portions. The plurality of portions may comprise a plurality of substantially flat portions configured to pass light unshifted through the apparatus. The first prism, the second prism, and the third prism may be positioned on the at least one lens to combine four visual regions including a first region around a central portion of a field of view, a second region below the central region, a third region left of the central region, and a fourth region right of the central region, wherein the second region, the third region, and the fourth region represent shifted views augmenting the field of view of a wearer of the at least one lens. The lens may be a spectacle lens. The first region can be a non-prism first region. The third region may be above and left of the central region. The fourth region may be above and right of the central region.

In some example implementations, there is provided yet another apparatus. The apparatus may include at least one lens including a first prism having a first apex and a first base, and may have a second prism, wherein the first base is oriented away from a nasal region of the at least one lens, wherein the second prism is positioned below the first prism, and wherein the second base is oriented in downward direction.

In some variations, one or more of the following features can optionally be included in any feasible combination. At least one of the first and second prisms may further comprise a plurality of prism portions configured to shift light passing through the apparatus including the plurality of prisms portions, and may include a plurality of portions configured to pass light unshifted through the apparatus including the plurality of prisms portions. The plurality of portions may comprise a plurality of substantially flat portions configured to pass light unshifted through the apparatus. A central portion of the first prism may be positioned substantially centered above a central portion of a pupil of an eye wearing the at least one lens. The first apex of the first prism may be positioned substantially centered above a central portion of a pupil of an eye wearing the at least one lens. The central portion of a field of view may be unaffected by any of the first prism, the second prism, or the third prism. The first apex and the second apex may be oriented in an apex-to-apex configuration above a line of sight in primary gaze. The third base may be oriented in downward direction and positioned below a line of sight in primary gaze. The first prism may be positioned with the first apex substantially centered on the lens above a central portion of a pupil of a wearer's eye when at primary gaze and the first base may be positioned away from a nasal region.

In some example implementations, there is provided yet another apparatus. The apparatus may include at least one lens including a first prism having a first apex and a first base, and a second prism having a second apex and a second base. The first base may be oriented away from a nasal region of the at least one lens and the second base may be oriented towards a nasal region of the at least one lens.

In some variations, one or more of the following features can optionally be included in any feasible combination. At least one of the first and second prisms may further include a plurality of prism portions configured to shift light passing through the apparatus including the plurality of prisms portions, and a plurality of portions configured to pass light unshifted through the apparatus including the plurality of prisms portions. The plurality of portions may include a plurality of substantially flat portions configured to pass light unshifted through the apparatus.

In some example implementations, there is provided yet another apparatus. The apparatus may include at least one lens including a first prism having a first apex and a first base. The first prism may further include a plurality of prism portions configured to shift light passing through the apparatus including the plurality of prisms portions, and a plurality of portions configured to pass light unshifted through the apparatus including the plurality of prisms portions.

In some variations, one or more of the following features can optionally be included in any feasible combination. The first base may be oriented away from a region of the at least one lens. The first prism may be positioned nasally at least in part over a bridge of a nose and with the first base oriented in a direction of the nose. The first prism may be positioned in a peripheral region and the first base may be oriented away from a nasal region.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 11A-C depict pictures including simulated views provided by Quadrafield prism glasses, according to some implementations of the current subject matter;

DETAILED DESCRIPTION

Prisms, such as Fresnel prisms and the like, can be used in connection with a variety of low vision conditions including loss of central field, hemianopia, peripheral field loss, monocular vision, and the like. In these low vision conditions, a portion of a patient's visual field is lost or impaired. To address some of this loss or impairment, conventional prisms, such as a Fresnel prism and the like, can be used to shift a view or image from the lost or impaired portion of the visual field to a portion of the visual field that can still see. Although conventional prisms can shift views, this shifting comes at the cost of a blocked view behind the conventional prism. This blocked view is referred to as an apical scotoma. The apical scotoma is a blind spot formed by the conventional prism itself and the extent of the apical scotoma is related to the amount of visual field extension provided by the conventional prism's shifting. Specifically, the corresponding region behind the conventional prism that is blocked due to the apical scotoma is about equal in extent to the conventional prism's power measured in terms of, for example, prism diopter (PD and/or $\Delta$). An accurate relationship between apical scotoma and prism power is described in Jung, (J.-H., & Peli, E. (2014). Impact of high power and angle of incidence on prism corrections for visual field loss. *Optical Engineering*, 53(6), Article 061707, 061707).

Figures 7A, 7B, 7C:
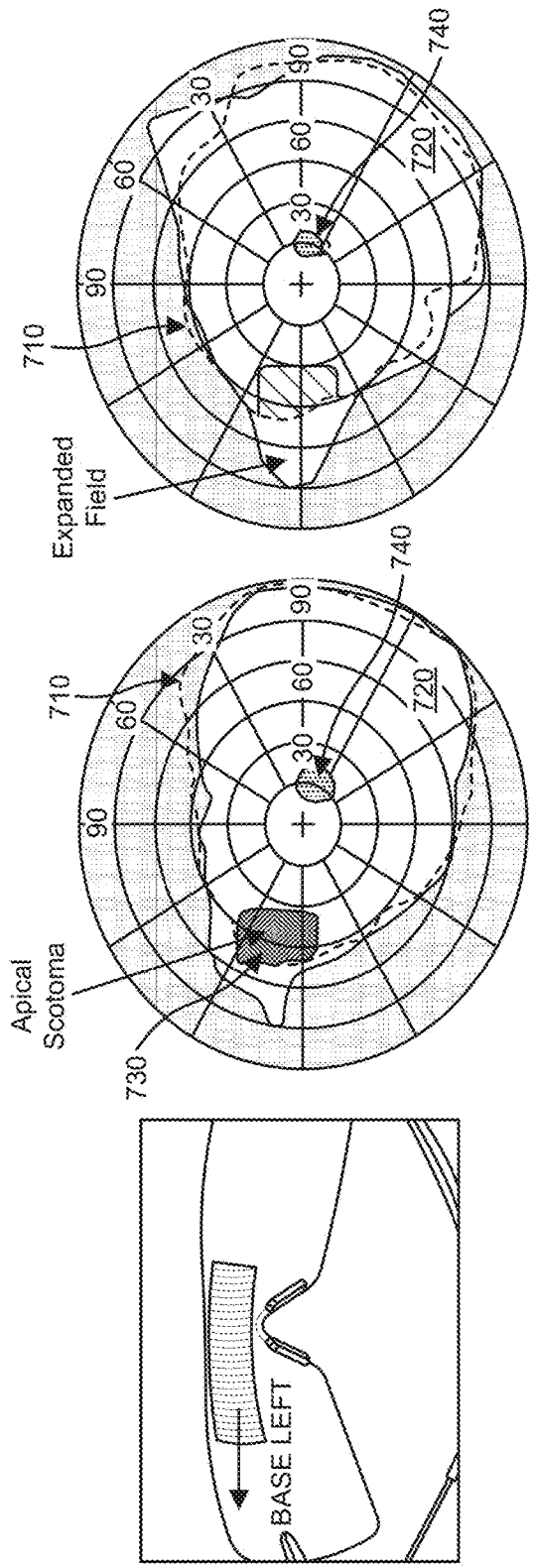
FIG. 7A depicts spectacles with a 40Δ conventional press-on Fresnel prism mounted over the bridge for acute monocular vision (AMV) with only OD functioning.
FIG. 7B depicts a field of view modified with a conventional Fresnel prism, illustrating the substitution of field on left for field then missing at the prism apex.
FIG. 7C depicts a field of view modified with a multiplexing prism in which the field at the prism apex is not lost.
Figure 13:
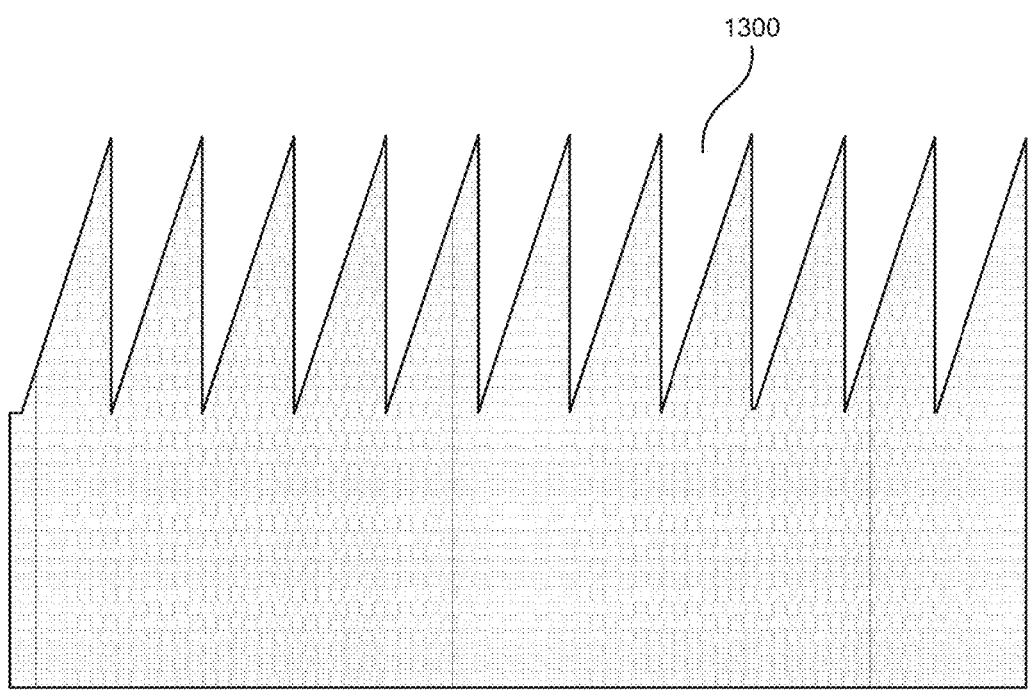
FIG. 13 depicts an example of a conventional Fresnel prism.

FIG. 13 depicts an example of a conventional Fresnel prism 1300, and FIG. 7B depicts a plot of a Goldmann perimetry representative of a patient's field of view with and without prisms. The patient's field of view without prisms is the area inside the dashed line 710. The white area 720 is the field of view that is modified with a prism to shift a view or image from the lost or impaired portion of the visual field to a portion of the visual field that can still see. The vision expansion area is the white area outside the dashed line 710. But this shifting by the conventional prism comes at the cost of an apical scotoma 730. The physiological blind spot at the optic nerve head can be seen at 740. The lack of exact correspondence between the dashed outline and the non-expanded portion of the view with the prism is measurement error common to this type of measurement.

In some example embodiments, the subject matter disclosed herein relates to a multiplexing prism. The multiplexing prism comprises one or more prismatic elements, such as an array of prisms, and one or more non-prismatic portions. Specifically, the multiplexing prism's array of prisms shifts (for example, bends) light like a conventional prism, but the multiplexing prism further includes one or more transparent non-prismatic portions that do not shift light—allowing the unshifted light or view to be interspersed (e.g., combined or multiplexed) with the shifted light or view. With close spacing of the elements, this view can be perceived as an overlaying of the shifted and unshifted views. In some example embodiments, this transmission of light through the multiplexing portion(s) can reduce, and may effectively eliminate, the apical scotoma that would be formed but for the presence of the non-shifting portions of the multiplexing prism.

Figure 1:
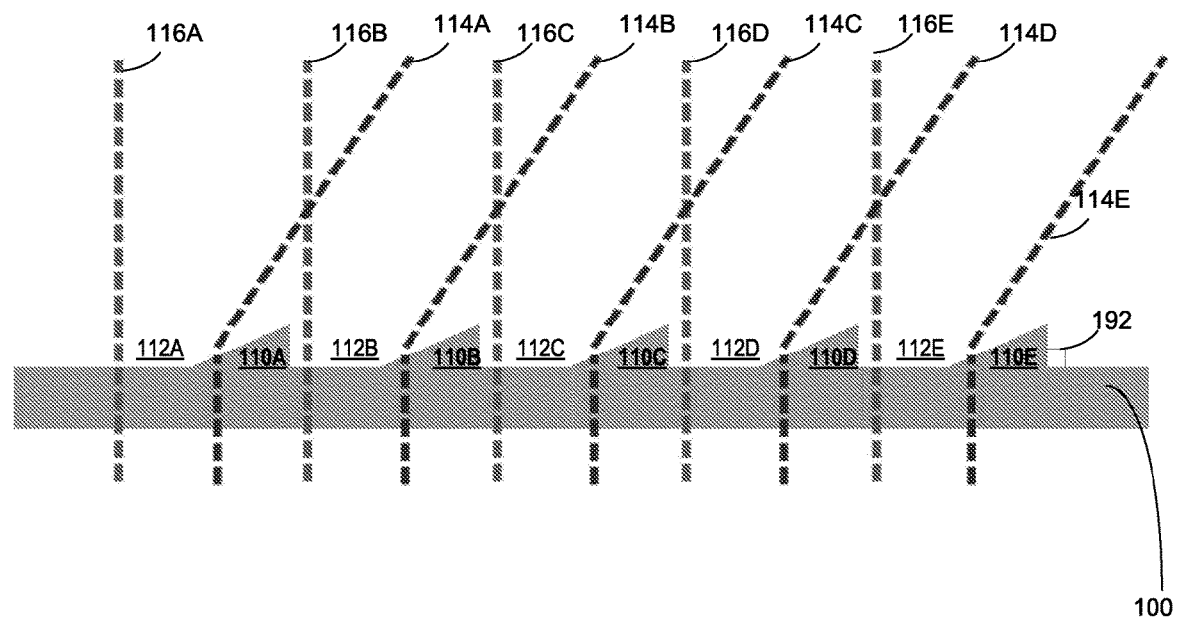
FIG. 1 illustrates an example of a multiplexing prism, according to some implementations of the current subject matter.

FIG. 1 depicts an example of a multiplexing prism 100, in accordance with some example embodiments. The multiplexing prism 100 includes an array of prisms 110A-E and non-shifting portions 112A-E. The array of prisms 110A-E shifts, in accordance with Snell's law, light 114A-E (which may represent a view or image being shifted), while the non-shifting portions 112A-E are substantially flat and do not substantially shift light 116A-E (which also represents a view or image). "Substantially flat" in this context refers to a portion of the prisms being sufficiently flat to not induce a significant and/or noticeable amount of shifting of the light incident on the flat portion of the filter (or that is substantially smaller than the shift induced by the shifting prism elements). The multiplexing prism 100 may thus simultaneously multiplex shifted and unshifted views, and in some example embodiments, reduce or may eliminate the apical scotoma, which are present in conventional prisms, such as a Fresnel prism.

In some example embodiments, the spacing of the substantially flat, multiplexing portions 112A-E can be varied. For example, reducing the relative area of the non-shifting portions 112A-E would increase the brightness of the image shifted by the array of prisms 110A-E and would also result in a relatively dimmer image of the unshifted view, while increasing the area of the non-shifting portions 112A-E would decrease the brightness of the image shifted by the corresponding array of prisms 110A-E and would also result in a brighter (for example, greater contrast) image of the unshifted view.

The plurality of prism portions 110A-E (also referred to as prismatic elements) may be oriented with their apex axes parallel and their base-apex vector oriented in essentially the same direction. The multiplexing prism 100 may include a multiplexing prism apex at an apex of the prismatic element in the base-apex direction. The multiplexing prism 100 may include a multiplexing prism base opposite the apex. An orientation of a multiplexing prism axis may be defined independently of a shape of the multiplexing prism. A prism may include conventional, Fresnel, and multiplexing prisms.

In some example implementations, the multiplexing prism 100 may include a plurality of prism portions 110A-E configured to shift light passing through the multiplexing prism 100 at a first angle; and a plurality of portions 112A-E configured to pass light shifted through the apparatus at a second angle.

In some example embodiments, the base of each of the prisms 110A-E may be perpendicular 192 to the flat surface of the non-shifting portions 112A-E. However, in some example embodiments, the base of each of the prisms 110A-E may be oblique relative to the flat surface of the flat, non-shifting portions 112A-E. Moreover, the apex (for example, the point) of each of the prisms 110A-E may be angled toward a point, such as a patient's eye. As noted, this view shifting can be used with a variety of conditions to expand or enhance the field of view of patients with visual field loss due to conditions, such as hemianopia, loss of vision in one eye, retinitis pigmentosa, and the like. In addition, the multiplexing prism 100 may be used in spectacles designed to expand the visual field of patients without introducing a corresponding apical scotoma. Moreover, the multiplexing prisms disclosed herein may be used in other applications as well to provide increased peripheral awareness, as for cyclists, soldiers, athletes, and others seeking an expanded field of view.

Figure 2:
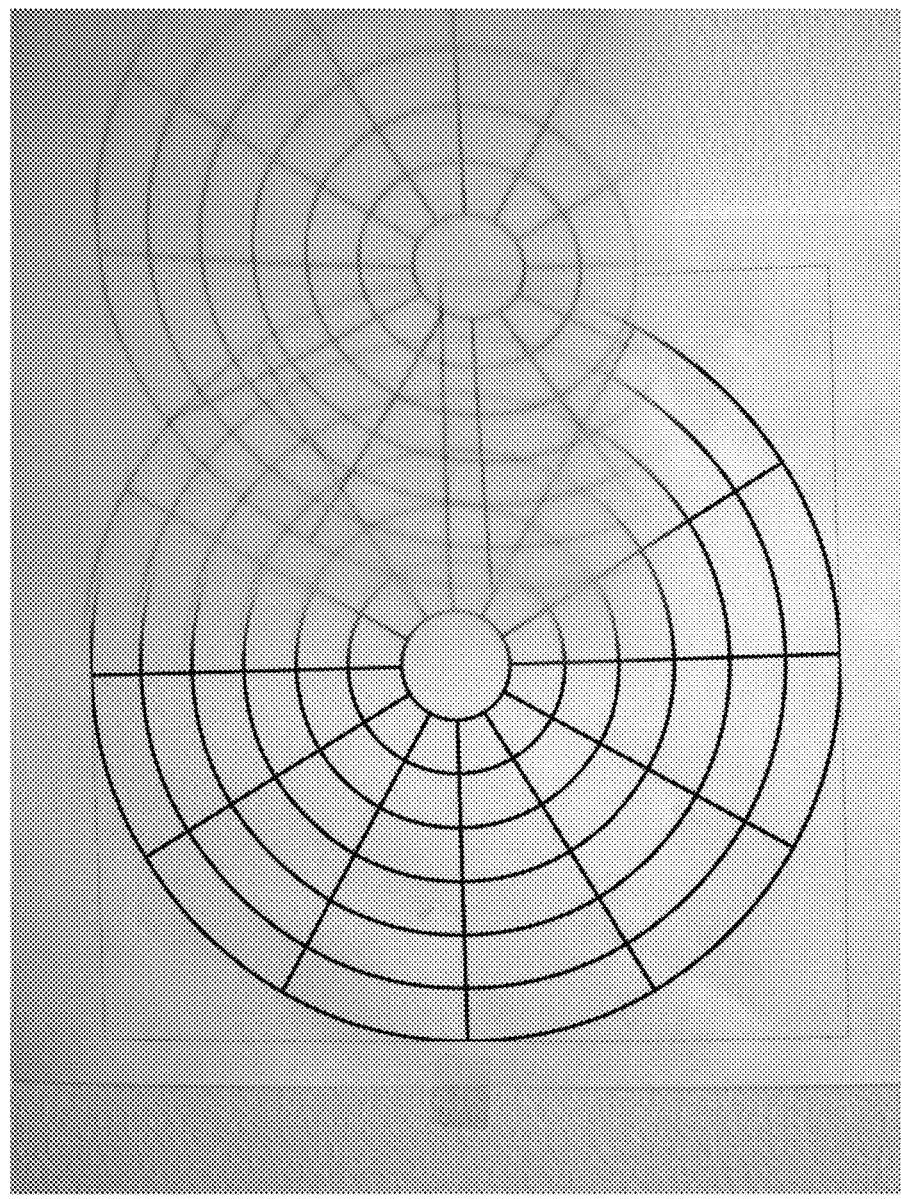
FIG. 2 is a photograph of a polar grid taken by a camera that has a multiplexing prism in front of part of its field of view and illustrates the multiplexed view generated by a multiplexing prism, according to some implementations of the current subject matter.

FIG. 2 depicts a photo of a perimetry grid taken with a 40 PD multiplexing prism, such as multiplexing prism 100, placed partially in front of a camera lens. When the spacing of the prismatic segments, such as prism array segments 110A-E, is sufficiently fine so that individual segments are not resolved when near the eye or camera lens, a multiplexed view results including a shifted view 220 and a straight-through view 210 as shown in FIG. 2. The unshifted, direct view 210 passes through flat segments 112A-E and the shifted view 220 deflected through prism portions 110A-E, but there is no area of the views lost/blocked due to an apical scotoma. In some example embodiments, oblique (for example, slanted) prisms may be used to combine the lateral and vertical shifts. And, as noted, the relative widths of the flat and prismatic segments can be varied to vary the contrast of the two views 210 and 220.

Figure 3:
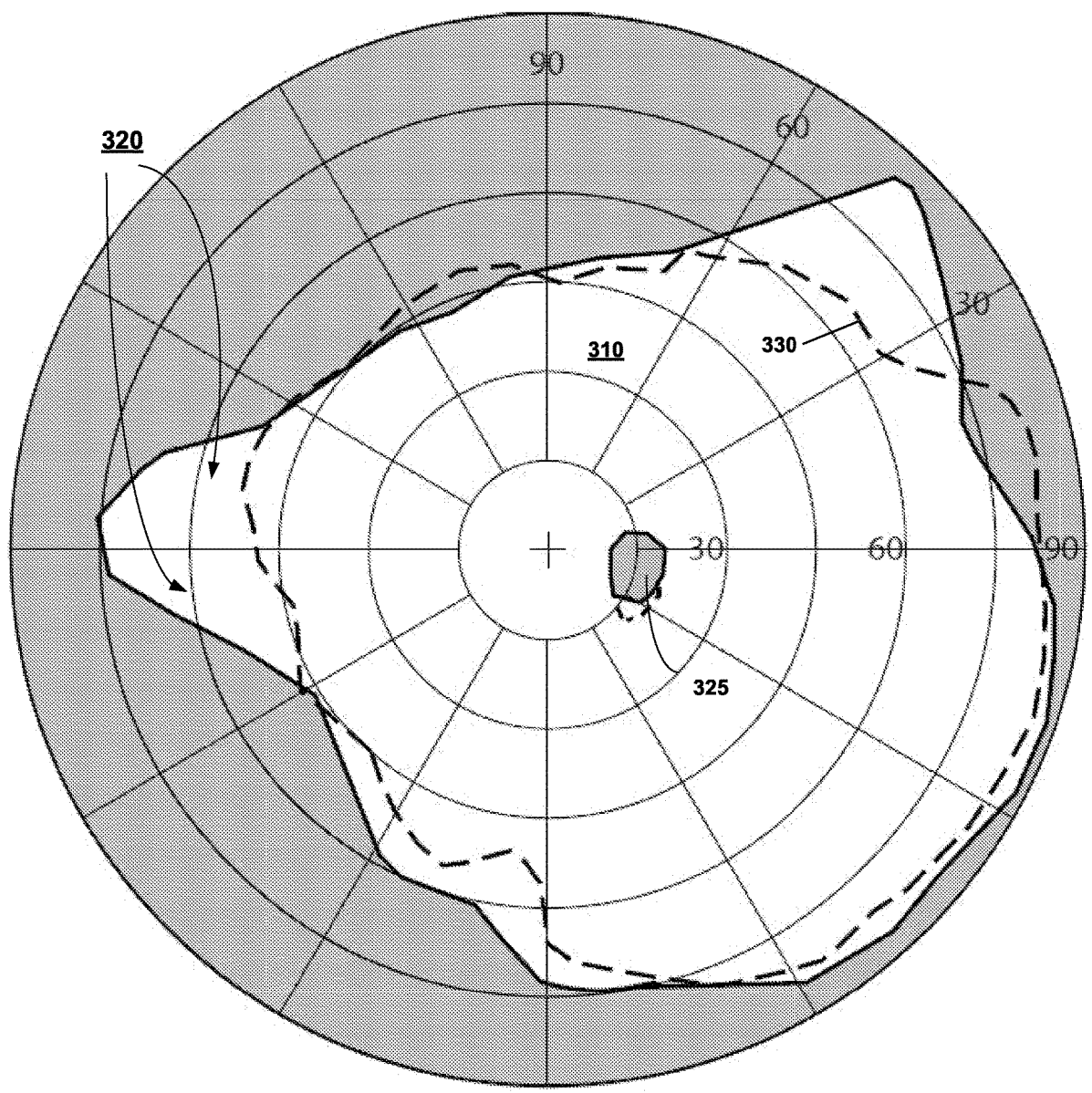
FIG. 3 illustrates composite Goldmann perimetry plots of the field of view of a right eye of a person with no functional vision in the left eye illustrating expansion to the left by the multiplexing prism and no field lost to an apical scotoma, according to some implementations of the current subject matter.

FIG. 3 depicts a plot of a Goldmann perimetry representative of a monocular patient's field of view. The area inside the dashed line 330 is the patient's field of view without a prism. The portion of the field of view that can be seen or perceived by the patient with a multiplexing prism according to an example embodiment is unshaded 310, and portion 320 lying outside dashed line 330 in the direction of the prism base represents a portion of the field of view expanded using the multiplexing prism. As can be seen at FIG. 3, there is as expected a physiological blind spot 325 as in the case of FIG. 7B at 740, but there is no apical scotoma present within the field of view.

Figure 4:
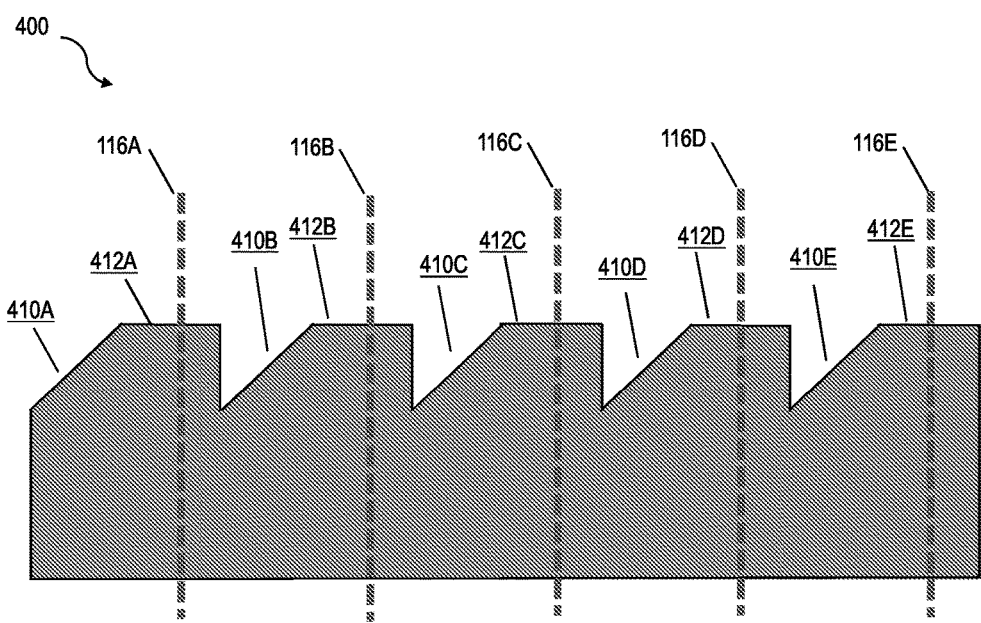
FIG. 4 illustrates another example of a multiplexing prism, according to some implementations of the current subject matter, in which non-shifting portions have been provided by flattening the peaks of the prismatic portions rather than the inter-prism portions of FIG. 1.

FIG. 4 depicts another example of a multiplexing prism 400, in accordance with some example embodiments. The multiplexing prism 400 is similar to prism 100 in some respects but the placement of the flat, non-shifting portions differs. Specifically, prism 400 includes an array of prisms 410A-E and flat portions 412A-E, but the flat, non-shifting portions 412A-E are positioned at the points of the prisms to allow light to pass through unshifted. In the example of FIG. 4, the array of prisms 410A-E shift light (which may represents a view or image being shifted), while portions 412A-E do not shift light 116A-E (which also represents a view or image). Like multiplexing prism 100, multiplexing prism 400 simultaneous multiplexes shifted and unshifted views through the device 400 and reduces or eliminates the apical scotoma. In some example embodiments, a multiplex prism may include non-shifting portions at both the points and bottom of the prismatic elements. Other variations are possible.

Figure 5:
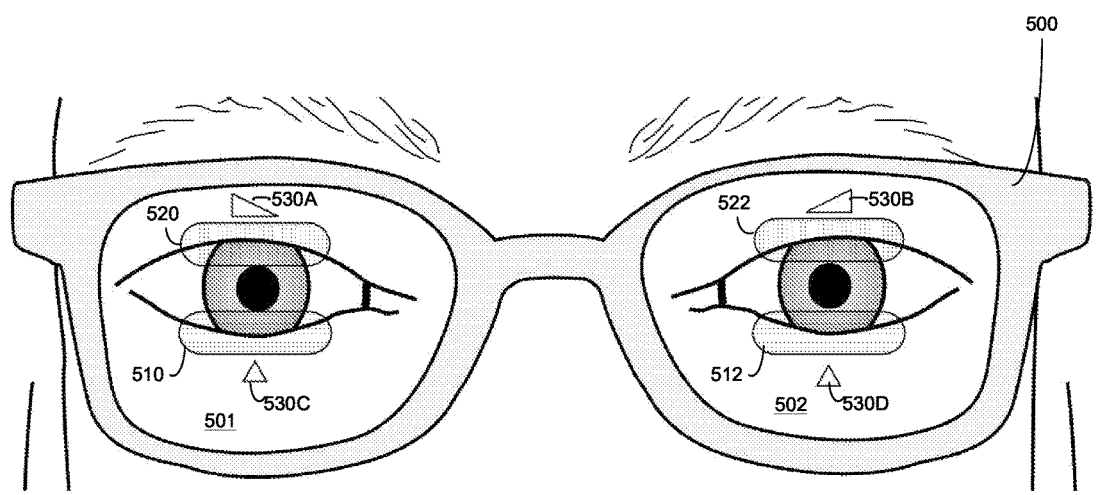
FIG. 5 depicts an example of spectacles configured with prisms, in which the small triangles indicate the orientation of the prism bases, according to some implementations of the current subject matter.

FIG. 5 depicts an example implementation of spectacles 500 including prisms 510, 520, 512, and 522. In the example of FIG. 5, the prisms are configured for concentric peripheral field of vision loss, as due to retinitis pigmentosa, although the prisms may be configured to address other visual conditions as well. Specifically, FIG. 6B depicts a simulated dichoptic perimetry diagram using multiplexing prisms showing high-power, lower prisms 510 and 512 to provide a lower visual field expansion island. The high power lower prisms 510 and 512 may have prism powers of 57Δ, 74Δ, and the like, although other prism powers may be implemented as well. The upper prisms 520 and 522 may be implemented as oblique prisms (as depicted in FIG. 6B) configured with bases-out to position the source of the expanded view lateral to the residual view but shifted down towards the center. The triangles 530A-D above and below the multiplexing prism 510, 512, 520, and 522 illustrate base orientations of the prism portions (for example, bases oriented down 530C-D for prism portions at 510 and 512 and bases oriented out 530A-B for prism portions at 520 and 522).

Although FIG. 5 depicts a specific configuration of prism 510, 512, 520, and 522, other configurations and/or quantities of prisms may be used as well. For example, the prism may be a multiplexing prism.

Figure 6A:
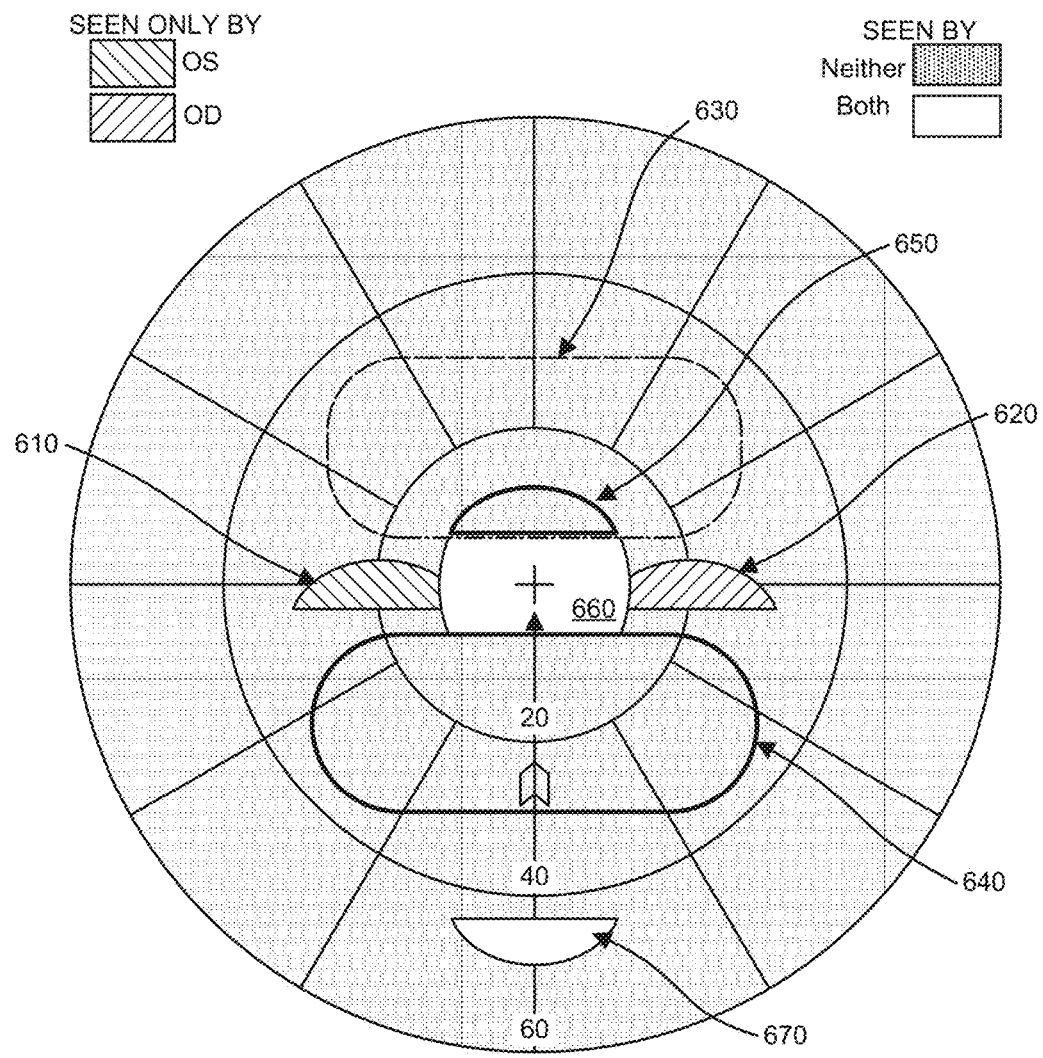
FIG. 6A depicts a simulated plot of a field of view expansion provided by spectacles with traditional prisms positioned as illustrated in FIG. 5, according to some implementations of the current subject matter.
Figure 6B:
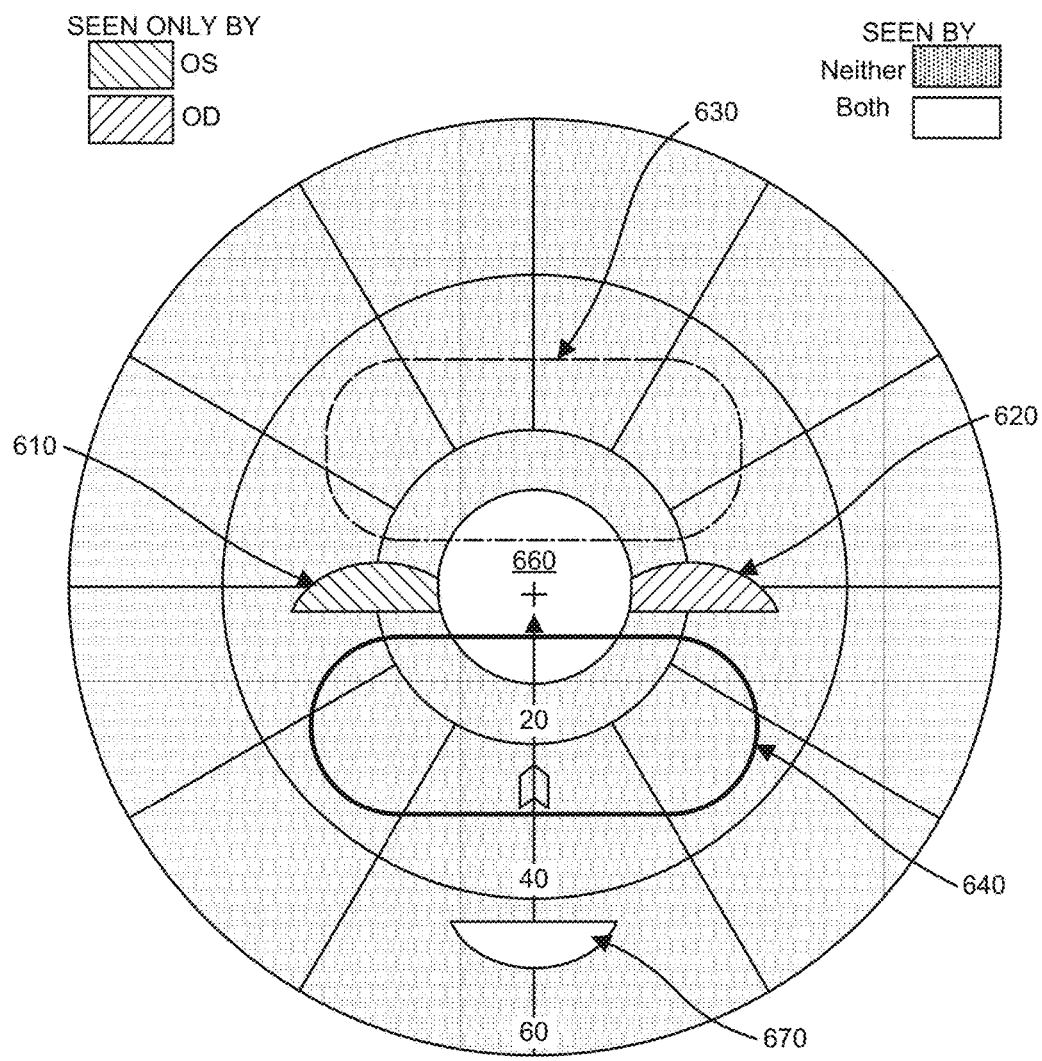
FIG. 6B depicts simulated plot of the field of view expansion provided by the spectacles of FIG. 5 for a person with concentric visual field loss and a residual field diameter of 12 degrees in each eye, if the prisms are 20 prism diopter multiplexing prisms, according to some implementations of the current subject matter.

FIG. 6A depicts a simulated plot of a field of view expansion provided by spectacles with prisms positioned as illustrated in FIG. 5, in which the prisms are conventional Fresnel prisms. White region 660 can be seen by both eyes and the regions seen by only the left eye (OS), hatching 610, and only by the right eye (OD), hatching 620. The dashed outlines (630) identify the location of the upper oblique prisms, which have their bases tilted slightly toward the horizontal meridian. Solid black outline 640 indicates the location of the lower base-down prism. An apical scotoma 650 is created by the upper oblique prisms 630. The white area 670 represents the shifted view seen by both eyes through the lower prisms 510 and 512.

FIG. 6B depicts a plot of a dichoptic simulated visual field for the configuration of FIG. 5, showing the separate contributions of each eye to the binocular field with multiplexing prisms. Specifically, the plot illustrates the difference between the white region 660 seen by both eyes and the regions seen by only the left eye (OS), hatching 610, and only by the right eye (OD), hatching 620. The dashed outlines (630) identify the location of the upper oblique prisms, which have their bases tilted slightly toward the horizontal meridian. Solid black outline 640 indicates the location of the lower base-down prism. A clear central field 660 (for example, the unshaded central portion) is shown along with the expanded field of view regions 610 and 620 provided by the shifting and multiplexing of the multiplexing prisms of FIG. 5. Because multiplexing prisms are used, an apical scotoma (for example, as illustrated at 650 in FIG. 6A) is not present at FIG. 6B. The white area 670 represents the shifted view seen by both eyes through the lower prisms 510 and 512.

FIG. 7A depicts spectacles with a 40Δ conventional press-on Fresnel prism mounted over the bridge for a patient with monocular vision with only right eye functioning. Edges of the prism are highlighted for illustrative purposes. The size of the prism can vary, for example, the left extent of the prism shown in FIG. 7A can be shorter or longer than shown. FIG. 7B depicts a field of view modified with a conventional Fresnel prism configured as in FIG. 7A, illustrating the substitution of field at the left for field then missing at the prism apex. Field expansion (e.g., white area outside dashed line 710) and the apical scotoma of 20° at 730 are evident. The unaided field is shown in the dashed line 710. FIG. 7C depicts a field of view modified with a multiplexing prism in which the field at the prism apex is not lost. Field expansion without apical scotoma is achieved with a multiplexing prism of 40Δ configured as in FIG. 7A. A lower contrast due to an effect of the multiplexing prism may occur in the crosshatched area.

Figure 8A:
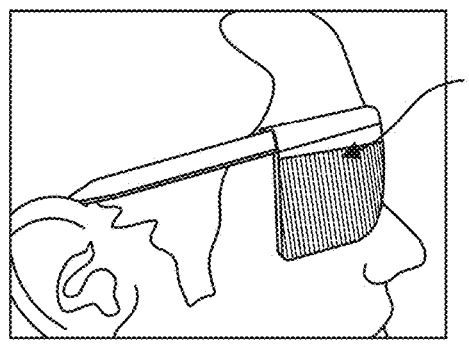
FIG. 8A depicts a conventional Fresnel prism mounted base out on a lateral wing of a spectacle frame, according to some implementations of the current subject matter.
Figure 8B:
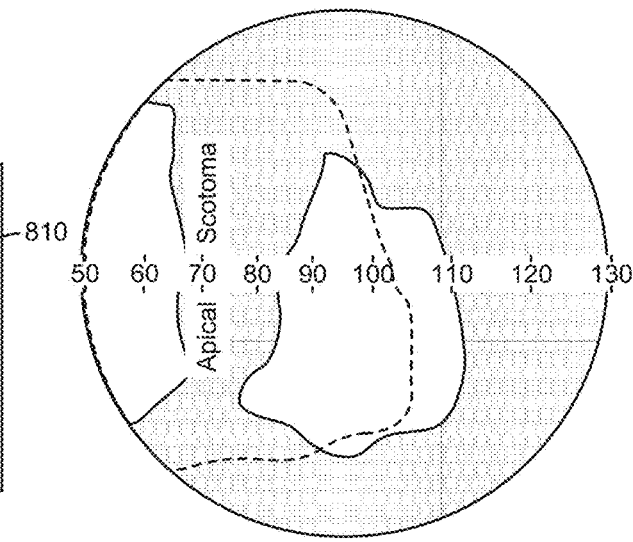
FIG. 8B depicts a field of view recorded using the spectacles illustrated in FIG. 8A, according to some implementations of the current subject matter.
Figure 8C:
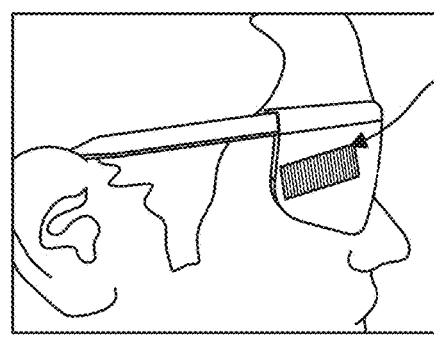
FIG. 8C depicts a segment of multiplexing prism mounted to the lateral wing of a spectacle frame, according to some implementations of the current subject matter.
Figure 8D:
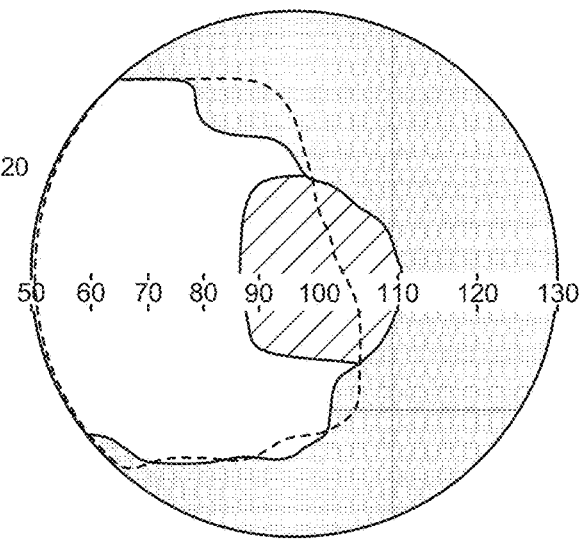
FIG. 8D depicts a field of view recorded using the spectacles of FIG. 8C, according to some implementations of the current subject matter.

FIG. 8A depicts a conventional Fresnel prism 810 mounted base out on a lateral wing of a spectacle frame to expand the field view of the wearer of the spectacles, according to some implementations of the current subject matter. The conventional Fresnel prism 810 has a 40Δ power. FIG. 8B depicts a field of view recorded using the spectacles illustrated in FIG. 8A. An expansion of about 10° is shown with a corresponding apical scotoma of about 15°. FIG. 8C depicts a segment of multiplexing prism 820 mounted to the lateral wing of a spectacle frame. FIG. 8D depicts a field of view recorded using the spectacles of FIG. 8C. The field recorded and illustrated in FIG. 8D with the multiplexing prism shows a shorter expanded area (due to the shorter prism used) and no detected apical scotoma. The field was measured using dark targets on a bright background in a perimeter to avoid false detections of spurious reflections and scattering of light. The subject was facing approximately 90° away from the center of the perimeter screen. The deviations from the expected 20° expansion and scotoma sizes can be attributed to the measurement method and also by prism distortion at wide angles. In the example of FIGS. 8C and 8D, the multiplexing prism 820 expands the normal field of view and, in particular, the peripheral vision of the wearer, without the blockage/loss caused by the conventional prism's apical scotoma. A cyclist, soldier, or other user seeking expanded field of view may wear spectacles and multiplexing prism 820 for enhanced peripheral vision. Although not shown, another multiplexing prism may be similarly positioned on the other lens of spectacles as well. Moreover, the multiplexing prism 820 may be placed in other locations relative to the spectacles as well.

In some example embodiments, narrow horizontal strips of vertical Fresnel prism (which shift light or views) can alternate with narrow clear, flat horizontal segments (which do not shift light or views). With finer segments and gaps, the segments become visually unresolved, and the perception is that of superimposed shifted and unshifted views. At intermediate spacing, the views/images do not fuse, but each segment provides sufficient optical quality. Fairly large gaps may be useful if the objects that are to be detected are generally large enough to span several segments. In this larger-gap design, the prisms may have better contrast but at the cost of lower resolution, so large objects may be detected at lower contrast (which may suitable in some applications, such as bicyclists, military, and the like).

The following provides example implementations of Quadrafield prism glasses configured with multiplexing prisms disclosed herein, although the Quadrafield prism glasses may be used with other types of prisms as well. The Quadrafield prism glasses disclosed herein may be configured to assist patients having certain conditions causing a loss in some of the field of view. For example, the Quadrafield prism glasses may be used to expands the visual field of low vision patients suffering from concentric peripheral field loss, such as that caused by glaucoma, retinitis pigmentosa, and/or choroideremia. Specifically, the Quadrafield prism glasses may expand the field of view of the patient at almost all positions of lateral gaze, without impacting clear binocular central vision, thus serving as a mobility aid.

Generally, the visual field areas that have a greater impact on mobility performance are the lateral and lower peripheral regions, so shifting these areas into a portion of the patient's eye where there is vision serves as a mobility aid. The shifting of the lateral field can be used to detect and avoid objects located in the lateral periphery, such as other pedestrians, moving obstacles, and oncoming hazards. The shifting of the lower visual field can be used to allow the patient to detect and avoid floor-level usually stationary obstacles. The Quadrafield glasses disclosed herein may provide visual field expansion in the lateral and lower peripheral regions.

In some example embodiments, the Quadrafield glasses disclosed herein may implement spatial multiplexing by shifting and/or superimposition, whereby small unseen view areas (also referred to herein as islands) of the field of view are shifted toward the patient's seeing field. For example, a patient may have, in a primary gaze position, four simultaneous visual field regions (hence the term Quadrafield lenses): a natural unaffected central field, two lateral islands (right and left) appearing in the uppermost remaining visual field, and an inferior island covering the floor in front of the user and appearing in their lower residual field. These four regions are further described below with respect to FIG. 10B. Perimetry data may be used to show the expected lateral and inferior extensions depicted at FIG. 10B. In addition, preliminary subjective evaluation of obstacle detection by a patient with severe peripheral field loss may suggest that the Quadrafield prisms may be usable by a patient.

The Quadrafield prism glasses/lenses disclosed herein may be used in some implementations to help with at least two mobility problems encountered by people with moderately reduced peripheral visual fields. Specifically, the Quadrafield prism glasses/lenses may help with detecting moving obstacles (for example, laterally moving obstacles including other pedestrians, cyclists, and the like) and detecting inferior obstacles (for example, static objects on the floor/ground including curbs, steps, and the like). These obstacles are further described below with respect to FIG. 11. The Quadrafield glasses may be used in environments with these obstacles and other obstacles found in environments, such as outdoor environments with uneven and variable walking surfaces, crowded and cluttered indoor environments including shops, malls, and transportation terminals. The Quadrafield prism glasses/lenses may also prove useful for visual search, as objects noticed in the wider areas covered by the prisms can then be foveated centrally via a gaze shift.

Figure 9:
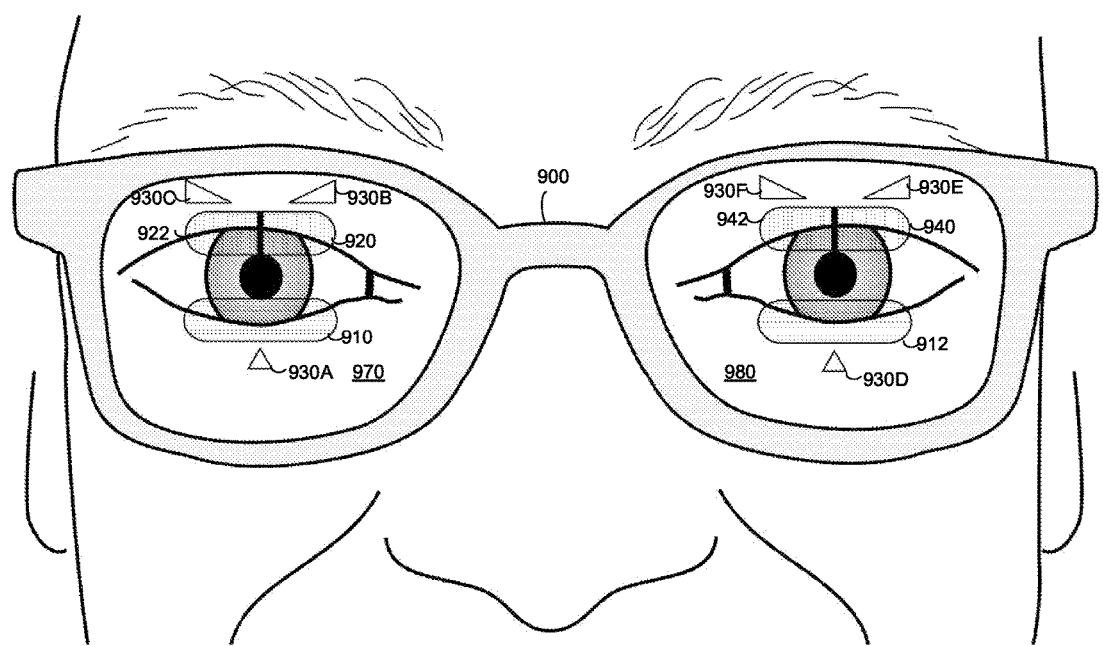
FIG. 9 depicts an example implementation of Quadrafield prism glasses, according to some implementations of the current subject matter.

FIG. 9 depicts an example implementation of Quadrafield prism glasses 900 including prisms 910, 920, 922, 912, 940, and 942. The configuration of FIG. 9 is referred to as an apex-to-apex configuration. The triangles 930A-F adjacent to each prism depict the direction of the base of each prism (for example, the base of prism 910 being oriented down like the corresponding triangle 930A). In the example of FIG. 9, lens 970 is configured with three prisms 910, 920, and 922. The two upper prisms 920 and 922 are configured with an apex-to-apex configuration, so that the apex of prism 922 and the apex of prism 920 are oriented towards each other as depicted by triangles 930B and C, and the base of prism 922 is also oriented away from the nasal area, while the base of prism 920 is oriented towards the nasal area. The lower prism 910 is oriented to have a base down as shown by triangle 930A. The prisms 912, 940, and 942 at lens 980 may be configured in a similar way as described with respect to lens 970.

The visual field shifting effect of FIG. 9 may take place at almost all lateral gaze positions, including primary gaze, although at lateral gaze positions one of the prisms of each eye induces a wider island than the other (for example, on the side of the gaze direction), and in extreme lateral gaze, only one peripheral island in the direction of gaze (for example, left or right) is available. This configuration may be used by binocular or monocular patients.

The prisms 910, 920, 922, 912, 940, and 942 may be implemented as multiplexing prisms, although other types of prisms may be used as well including Fresnel prisms and the like.

Figure 10B:
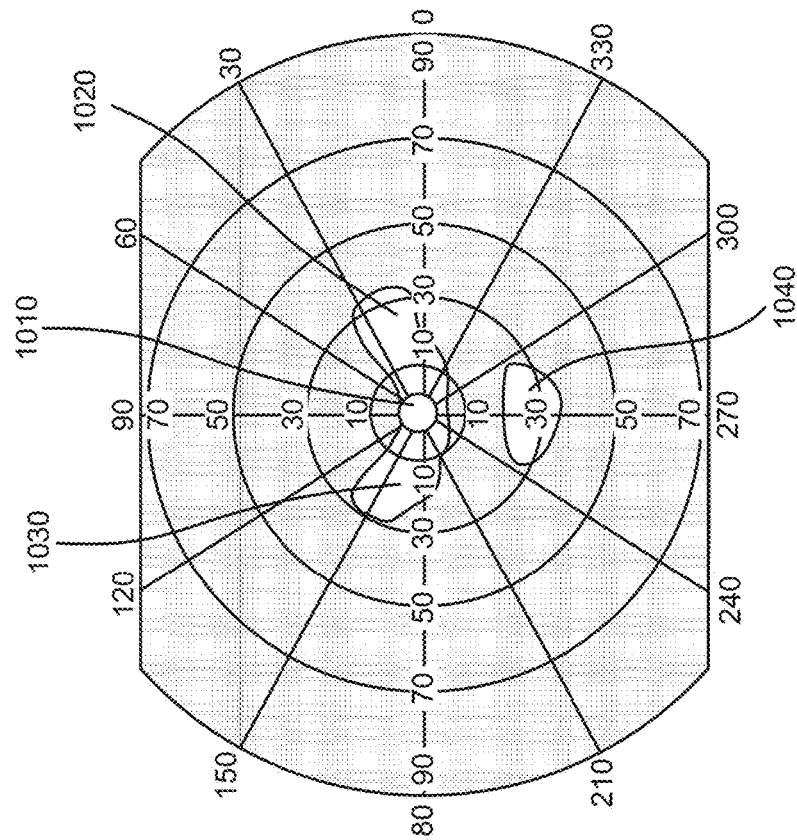
FIG. 10B depicts the field of vision of FIG. 10A expanded by Quadrafield prism glasses, according to some implementations of the current subject matter.
Figure 10A:
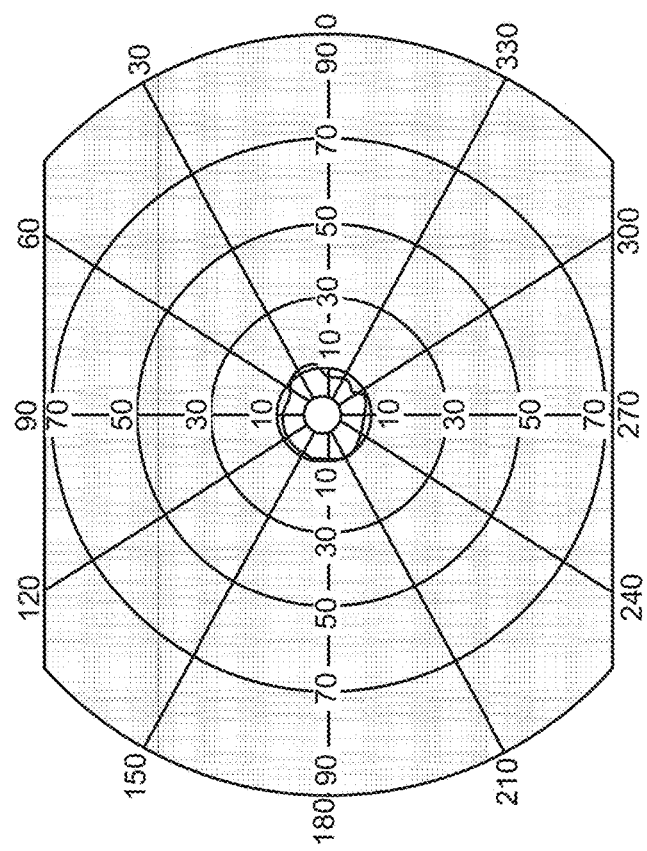
FIG. 10A depicts an example plot of a patient's constricted field of vision with concentric visual field loss due to Retinitis Pigmentosa.

FIG. 10A depicts a plot of a binocular visual field of a patient with only 20° remaining in horizontal visual field. The unshaded portion of the plot represents views/images that can be seen by the patient, and the shaded portions represent those portions that cannot be perceived by the patient. The unshaded portions of the plot show the portions of the patient's visual field measured with, for example, kinetic Goldman perimetry, and stimulus III4e. FIG. 10B depicts a plot of the binocular field of the same patient as in FIG. 10A, but the patient is fitted with the spectacles including prisms 910, 920, 922, 930, 940, and 942 depicted at FIG. 9. In the example of FIG. 10B, the patient's visual field has been expanded to now include four simultaneous visual field regions, a central field 1010 with a reduced vertical dimension and three peripheral extensions 1020, 1030, and 1040. In the example of FIG. 10B, the prisms 910, 920, 922, 912, 940, and 942 are implemented as 40Δ Fresnel press-on prisms, although other powers and other types of prisms including the multiplexing prisms may be used as well.

FIGS. 11A-C depict images simulating views seen through the Quadrafield prism glasses disclosed herein. FIG. 11A depicts a view as would be seen by a person with a normal visual field. FIG. 11B, however, depicts a person having peripheral field loss. Specifically, the region within circle 1100 represents the limited view of about 30 degrees for a person having peripheral field vision loss. The image within the circle is expanded at 1105 to further illustrate the limited view of about 30 degrees for a person having peripheral field vision loss, although the Quadrafield prism may be used with other degrees of vision loss as well. FIG. 11C shows the person having the 30 degree vision field wearing the Quadrafield prism glasses configured as described above with respect to FIG. 9. FIG. 11C shows that the wearer can now detect obstacles located laterally, such as the construction barrel 1195 and the person walking with the white coat 1196, and obstacles located in the inferior visual field, such as the box 1197 on the ground.

Figure 12:
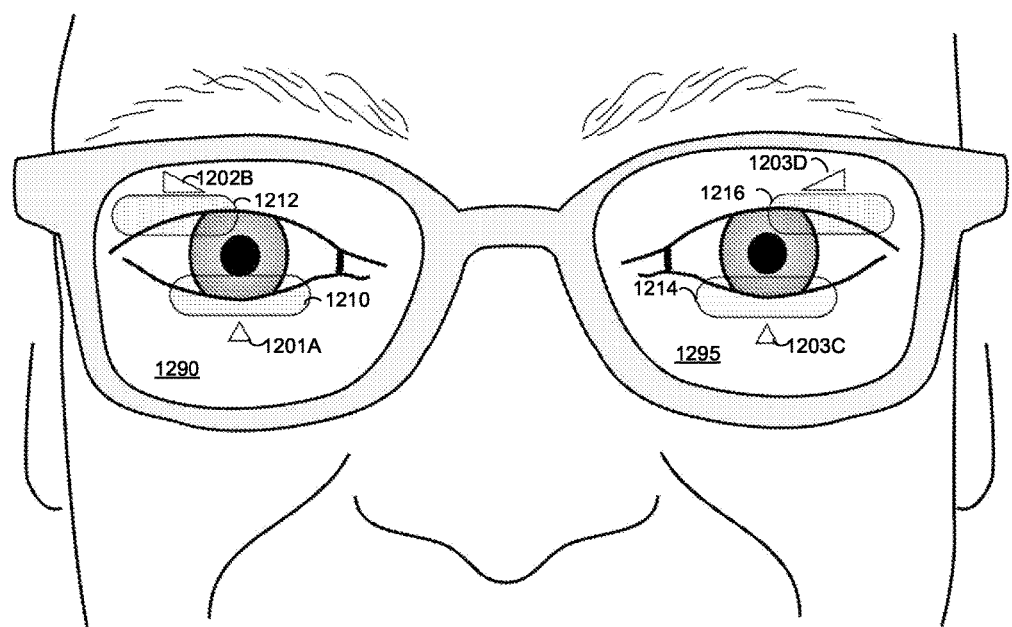
FIG. 12 depicts another example configuration of Quadrafield prism glasses, according to some implementations of the current subject matter.

FIG. 12 and FIG. 5 depict a variety of configurations of the Quadrafield prism glasses. In the examples depicted at FIG. 12 and FIG. 5, the prisms are fitted in the glasses so that they affect the upper lateral and lowermost peripheral areas of the patient's remaining field to bring objects from the non-seeing portions of the patient's periphery onto the residual functional retina above and below the central field. Moreover, FIG. 12 and FIG. 5 provide a central portion of the visual field free from prism effect, thus maintaining single binocular (or monocular if one eye only is functioning) vision.

FIG. 12 depicts a bitemporal configuration. Lens 1290 includes an upper prism 1212 having a base out configuration as shown by triangle 1202B and a lower prism 1210 having a base down as shown by triangle 1201A. The lower prism 1214 and upper prism 1216 at lens 1295 is similarly configured. The apex of each of prisms 1212 and 1216 may be positioned in line and above the pupil center, although other positions may be used as well. Specifically, the apex of each of prisms 1212 and 1216 may substantially align with the midline of the pupil at primary gaze. The configuration of prisms 1210-1216 enables multiplexing by shifting and by superposition of the patient's visual field. In this example, the temporal upper prism expanded view of each eye is seen superimposed on the nasal non-prism view of the other eye. An advantage of the FIG. 12 design is that it is easier to fit and does not need the perfect alignment of the prisms on both eyes, which is hard to achieve and maintain on the face when glasses move or bend. The design of FIG. 12 may be suitable only for patients with residual vision in both eyes and substantially symmetrical residual fields on both sides.

FIG. 5 depicts a base-out configuration. Lens 501 includes a lower base down prism 510 and an upper base-out prism 520 substantially centered above the pupil of the eye and substantially extending across the entire upper field of the patient, although other positions may be used as well. Lens 502 including prisms 512 and 522 may be similarly configured as noted for lens 501. In the design of FIG. 5, the size of the expansion islands (in primary position of gaze) is, in some typical configurations, limited to half of the width of the residual field in the upper segment. In this bilateral configuration, the width of the expanded field is essentially doubled. If multiplexing prisms are used, the apical scotomas in the periphery above and below primary gaze can be eliminated. Like in the bitemporal configuration, exact alignment of the segments on both lenses is not crucial. This configuration is also practical primarily for patients with vision in both eyes, though the symmetry between the eyes is less critical.

In an example implementation, a multiplexing prism 100 may be positioned to extend with base close to or above a bridge of the wearer's nose (for example, mostly in front of the seeing eye of someone with only one functional eye) to provide a multiplexed extended view of a region beyond that otherwise available in the nasal field. In another example implementation, one or two lenses structures with one or more multiplexing prisms 100 placed with base temporally and position far temporally on the lens provides multiplexed extended view of a peripheral region beyond that of a normal visual field. In yet another example implementation, a lens can include a multiplexing prism positioned substantially centered above the central portion of a pupil of an eye (when at primary gaze), and may have a second prism positioned substantially centered below the central portion of the pupil of the eye (when at primary gaze). The bases of each prism can be substantially oriented to one side (as for example, the blind side of a person with homonymous hemianopia).

Although ordinal numbers such as first, second, and the like, can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The use of the term "view" in the foregoing discussion and examples of the application of the invention to vision and vision augmentation are not intend to limit in any way the applicability of the invention as an optical element in any optical application for which it may serve.

The foregoing description is intended to illustrate but not to limit the scope of the invention, which is defined by the scope of the appended claims. Other implementations are within the scope of the following claims.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. Other implementations can be within the scope of the following claims.

What is claimed:

1. An apparatus comprising:
   a vision modification element configured to at least expand a visual field, the vision modification element including a plurality of prism portions configured to shift light passing through the apparatus including passing through the plurality of prisms portions, and further including a plurality of portions configured to pass light substantially unshifted and/or unshifted through the apparatus, wherein the apparatus combines the shifted light with the substantially unshifted light and/or unshifted light passing through the apparatus; and wherein the plurality of prism portions include a first prism portion and a second prism portion oriented in a same direction as the first prism portion, the first prism portion including an apex, the second prism portion including a base, and the plurality of portions including a substantially flat portion having a surface adjacent to the apex of the first prism portion and adjacent to the base of the second prism portion;

wherein the apparatus is configured to reduce an apical scotoma of a wearer by at least shifting light from an apical scotoma region of a visual field and combining the shifted light with the substantially unshifted and/or unshifted light in the apical scotoma region of the visual field.

2. The apparatus of claim 1, wherein the plurality of portions comprise a plurality of substantially flat portions configured to pass light unshifted through the apparatus.

3. The apparatus of claim 1, wherein the plurality of prism portions and the plurality of portions configured to pass light are located on a lens of spectacles in a location to expand the visual field.

4. The apparatus of claim 1, wherein the plurality of prism portions and the plurality of portions configured to pass light are located on a lens of spectacles to shift a view from a portion of the field of view lacking vision to another portion having vision and combining shifted and substantially unshifted light.

5. The apparatus of claim 1, wherein the apparatus comprises at least one lens including the plurality of prism portions and the plurality of portions.

6. The apparatus of claim 1, wherein at least one of the plurality of portions is positioned between the base of the second prism portion and the apex of the first prism portion.

7. The apparatus of claim 1, wherein the plurality of prism portions comprise Fresnel prisms.

8. The apparatus of claim 1, wherein the base of the first prism portion is substantially perpendicular to the surface of the substantially flat portion.

9. The apparatus of claim 1, wherein the apparatus includes spectacles for vision modification or wherein the vision modification element is configured to attach to spectacles for vision modification.

* * * * *